United States Patent
Sun et al.

(10) Patent No.: US 11,792,886 B2
(45) Date of Patent: Oct. 17, 2023

(54) METHOD FOR ACCESSING NETWORK BY NETWORK NODE, AND ELECTRONIC EQUIPMENT

(71) Applicant: BEIJING XIAOMI MOBILE SOFTWARE CO., LTD., Beijing (CN)

(72) Inventors: Hanbiao Sun, Beijing (CN); Liming Liu, Beijing (CN)

(73) Assignee: BEIJING XIAOMI MOBILE SOFTWARE CO., LTD, Beijing (CN)

( * ) Notice: Subject to any disclaimer, the term of this patent is extended or adjusted under 35 U.S.C. 154(b) by 240 days.

(21) Appl. No.: 17/488,006

(22) Filed: Sep. 28, 2021

(65) Prior Publication Data

US 2022/0312550 A1    Sep. 29, 2022

(30) Foreign Application Priority Data

Mar. 25, 2021  (CN) .......................... 202110321173.3

(51) Int. Cl.
*H04W 84/18* (2009.01)
*H04W 24/02* (2009.01)
(Continued)

(52) U.S. Cl.
CPC ........... *H04W 84/18* (2013.01); *H04W 24/02* (2013.01); *H04W 40/246* (2013.01);
(Continued)

(58) Field of Classification Search
CPC ..... H04W 84/18; H04W 84/20; H04W 84/22; H04W 76/10; H04W 76/11; H04W 76/14;
(Continued)

(56) References Cited

U.S. PATENT DOCUMENTS 7,813,341 B2 * 10/2010 Chang .................... H04L 45/24
370/236
8,214,322 B2 * 7/2012 Nishio .................. G06F 3/1288
370/254
(Continued)

FOREIGN PATENT DOCUMENTS

CN      109963352 A      7/2019
CN      110740460 A      1/2020
(Continued)

OTHER PUBLICATIONS

European Search Report in the European Application No. 21200056.6, dated Mar. 16, 2022, (xp).

*Primary Examiner* — Jenee Holland
(74) *Attorney, Agent, or Firm* — Arch & Lake LLP

(57) ABSTRACT

A first network node having gained access to a preset network receives a probe message broadcast by a second network node seeking access to the preset network. The probe message carries a second Internet Protocol (IP) address of the second network node. If the probe message includes a configuration mechanism identifier, the first network node unicasts a reply message of the probe message to the second network node based on the second IP address. The reply message carries a first IP address of the first network node. The first IP address is configured for establishing a network communication channel between the second network node and the first network node. The first network node sends network configuration information to the second network node through the network communication channel. The network configuration information is configured to allow the second network node to access the preset network.

14 Claims, 6 Drawing Sheets

(51) Int. Cl.
  *H04W 40/24* (2009.01)
  *H04W 48/16* (2009.01)
  *H04W 48/18* (2009.01)
  *H04W 76/10* (2018.01)
  *H04W 80/04* (2009.01)
  *H04W 8/00* (2009.01)
  *H04L 61/5007* (2022.01)
  *H04W 48/10* (2009.01)

(52) U.S. Cl.
  CPC ........... *H04W 48/16* (2013.01); *H04W 48/18* (2013.01); *H04W 76/10* (2018.02); *H04W 80/04* (2013.01)

(58) Field of Classification Search
  CPC ..... H04W 76/15; H04W 76/16; H04W 24/02; H04W 40/24; H04W 40/246; H04W 48/16; H04W 48/18; H04W 80/04; H04W 80/045
  See application file for complete search history.

(56) References Cited

U.S. PATENT DOCUMENTS

| | | | |
|---|---|---|---|
| 8,289,551 B2* | 10/2012 | Wu | G06F 3/1247 358/1.9 |
| 8,341,725 B2* | 12/2012 | Baykal | H04L 61/5014 726/13 |
| 9,184,930 B2* | 11/2015 | Singh | H04L 12/2801 |
| 10,009,805 B2* | 6/2018 | Van Oost | H04W 92/20 |
| 10,771,368 B2* | 9/2020 | Gossain | H04L 43/12 |
| 2007/0070959 A1 | 3/2007 | Almeroth et al. | |
| 2009/0274083 A1* | 11/2009 | Wentink | H04W 8/005 370/311 |
| 2010/0054154 A1* | 3/2010 | Lambert | H04L 61/5084 370/254 |
| 2010/0309813 A1* | 12/2010 | Singh | H04L 61/5014 370/254 |
| 2013/0166759 A1* | 6/2013 | Rajamani | H04L 69/16 709/227 |
| 2013/0170363 A1 | 7/2013 | Millington et al. | |
| 2013/0176897 A1* | 7/2013 | Wang | H04W 48/08 370/254 |
| 2014/0126406 A1* | 5/2014 | Ibanez | H04W 28/24 370/252 |
| 2016/0088039 A1 | 3/2016 | Millington et al. | |
| 2017/0163626 A1* | 6/2017 | Meng | H04W 48/10 |
| 2019/0260813 A1 | 8/2019 | Millington et al. | |
| 2021/0185101 A1 | 6/2021 | Millington et al. | |

FOREIGN PATENT DOCUMENTS

| | | |
|---|---|---|
| CN | 110896364 A | 3/2020 |
| CN | 110995665 A | 4/2020 |
| CN | 111314994 A | 6/2020 |
| WO | 2009135061 A1 | 11/2009 |

\* cited by examiner

METHOD FOR ACCESSING NETWORK BY NETWORK NODE, AND ELECTRONIC EQUIPMENT

CROSS-REFERENCE TO RELATED APPLICATIONS

This application claims the benefit of priority to Chinese Application No. 202110321173.3 filed on Mar. 25, 2021, the content of which is incorporated herein by reference in its entirety for all purposes.

TECHNICAL FIELD

The present disclosure relates to the field of network technology, and more particularly, to a method for accessing a network by a network node, and electronic equipment.

BACKGROUND

Sometimes, some wireless local area networks, such as a Mesh network, may include multiple nodes, where a node may be a gateway, a router, and the like. The nodes are interconnected to each other. A new node seeking to access the network may be allowed to join the network just by connecting the node seeking access to the network to one of the multiple nodes having gained access to the network (i.e., a node having gained access to the network), and allowing a user to perform network operation configuration.

SUMMARY

The present disclosure provides a method for accessing a network by a network node, and electronic equipment.

According to an aspect of examples of the present disclosure, there is provided a method for accessing a network by a network node, applied to a first network node having gained access to a preset network. The method includes: receiving a probe message broadcast by a second network node seeking access to the preset network, the probe message carrying a second Internet Protocol (IP) address of the second network node; in response to that the probe message includes a configuration mechanism identifier, unicasting, based on the second IP address, a reply message of the probe message to the second network node, the reply message carrying a first IP address of the first network node, the first IP address being configured for establishing a network communication channel between the second network node and the first network node; and sending network configuration information to the second network node through the network communication channel. The network configuration information is configured to allow the second network node to access the preset network.

According to an aspect of examples of the present disclosure, there is provided a method for accessing a network by a network node, applied to a second network node seeking access to a preset network. The method includes: in response to detecting that a cable is connected to a preset wired network interface, acquiring a second Internet Protocol (IP) address of the second network node from the preset wired network interface; broadcasting a probe message through the preset wired network interface, the probe message carrying a configuration mechanism identifier and the second IP address; receiving a reply message returned based on the probe message by a first network node having gained access to the preset network, the reply message including a first IP address of the first network node; establishing a network communication channel with the first network node based on the first IP address; receiving, through the network communication channel, network configuration information sent by the first network node; and accessing the preset network according to the network configuration information.

According to an aspect of examples of the present disclosure, there is provided electronic equipment.

The electronic equipment includes: a processor; and a memory configured to store executable instructions executable on the processor.

The processor is configured to execute the executable instructions to implement any method here.

It should be understood that the general description above and the detailed description below are illustrative and explanatory, and do not limit the present disclosure.

BRIEF DESCRIPTION OF THE DRAWINGS

The accompanying drawings, which are incorporated in and form a part of this specification, illustrate examples consistent with the present disclosure and, together with the description, serve to explain the principles of the present disclosure.

DETAILED DESCRIPTION

Figure 1:
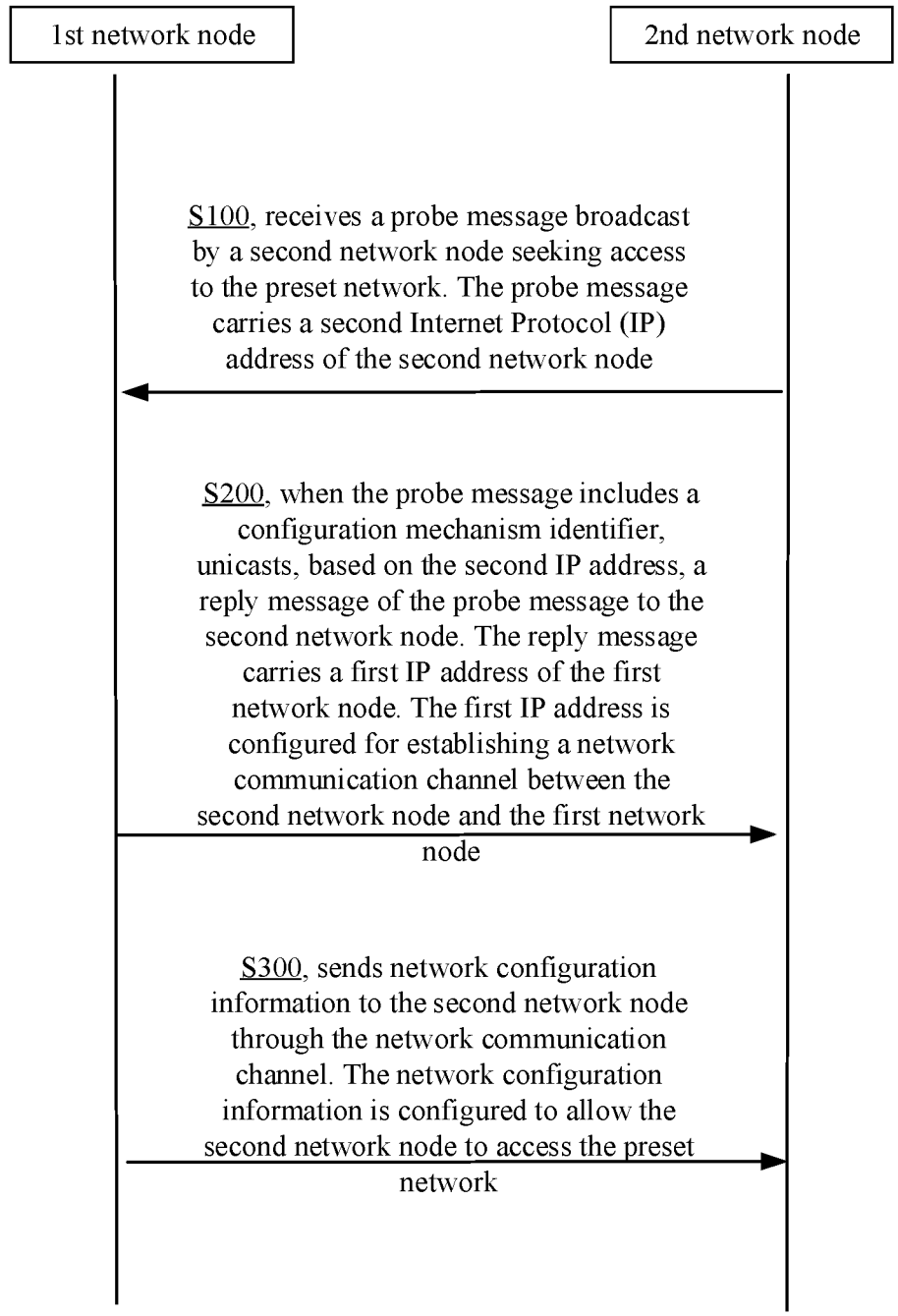
FIG. 1 is a diagram of timing of accessing a network by a network node according to an illustrative example.

Reference will now be made in detail to illustrative examples, examples of which are illustrated in the accompanying drawings. The following description refers to the accompanying drawings in which the same numbers in different drawings represent the same or similar elements unless otherwise represented. The implementations set forth in the following description of illustrative examples do not represent all implementations consistent with the present disclosure. Instead, they are merely examples of devices and methods consistent with aspects related to the present disclosure. The illustrative implementation modes may take on multiple forms, and should not be taken as being limited to examples illustrated herein. Instead, by providing such implementation modes, examples herein may become more comprehensive and complete, and comprehensive concept of the illustrative implementation modes may be delivered to those skilled in the art. Implementations set forth in the following illustrative examples do not represent all implementations in accordance with the present disclosure. Rather, they are merely examples of the apparatus and method in accordance with certain aspects herein.

Note that although a term such as first, second, third may be adopted in an example herein to describe various kinds of information, such information should not be limited to such a term. Such a term is merely for distinguishing information of the same type. For example, without departing from the scope of the examples herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of examples herein. However, those skilled in the art will know that the technical solutions of examples herein may be carried out without one or more of the details; alternatively, another method, component, device, option, etc., may be adopted. Under other conditions, no detail of a known structure, method, device, implementation, material or operation may be shown or described to avoid obscuring aspects of examples herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

A terminal may sometimes be referred to as a smart terminal. The terminal may be a mobile terminal. The terminal may also be referred to as User Equipment (UE), a Mobile Station (MS), etc. A terminal may be equipment or a chip provided that provides a user with a voice and/or data connection, such as handheld equipment, onboard equipment, etc., with a wireless connection function. Examples of a terminal may include a mobile phone, a tablet computer, a notebook computer, a palm computer, a Mobile Internet Device (MID), wearable equipment, Virtual Reality (VR) equipment, Augmented Reality (AR) equipment, a wireless terminal in industrial control, a wireless terminal in unmanned drive, a wireless terminal in remote surgery, a wireless terminal in a smart grid, a wireless terminal in transportation safety, a wireless terminal in smart city, a wireless terminal in smart home, etc.

Sometimes, in order to ensure network security, regardless of whether a node seeking access to a network is to be connected in a wired mode or a wireless mode, in network access configuration, a user is to select a node having gained access to the network that the user trusts to which the node seeking access to the network is to be connected. For wireless access, since the node having gained access to the network to be selected may not be equipment physically controllable by the user (such as equipment in someone else's home), manual selection by the user may be necessary. However, wired access is highly secure compared to wireless access. The user has to actively perform an operation such as cable insertion. Therefore, it is ensured that such equipment is within a range controllable by the user, with high security, in which case the requirement of manual configuration by the user leads to a complicated operation procedure.

FIG. 1 is a diagram of timing of accessing a network by a network node according to a technical solution herein. The method for accessing a network by a network node is applied to a first network node having gained access to a preset network, and includes steps as follows.

In S100, a probe message broadcast by a second network node seeking access to the preset network is received. The probe message carries a second Internet Protocol (IP) address of the second network node.

In the present disclosure, the first network node as well as the second network node may be a router, a gateway, etc.

In S200, when the probe message includes a configuration mechanism identifier, a reply message of the probe message is unicasted based on the second IP address to the second network node. The reply message carries a first IP address of the first network node. The first IP address is configured for establishing a network communication channel between the second network node and the first network node.

In S300, network configuration information is sent to the second network node through the network communication channel. The network configuration information is configured to allow the second network node to access the preset network.

In the example, the preset network is a local area network. The local area network includes, but is not limited to, a Mesh network (i.e., a multi-hop network), or a wireless network with multistage equipment connected to a central point, etc. A Mesh network includes multiple network nodes having gained access to the Mesh network. The second network node may be a node seeking access to the preset network. The first network node may be a node having gained access to the preset network. One of the multiple network nodes is selected through a preset selection mechanism to serve as the first network node within a predetermined period of time. The first network node may control a control node for the second network node to join the preset network. In the preset network, the control node may provide a network service by controlling whether a node seeking access to the network can join the preset network.

The second network node in the example may be a wireless Access Point (AP) or a router, etc., that seeks access to the network, and the first network node may be a node controlling the AP or the router in the preset network.

The preset network may have one first network node. Multiple second network nodes may join the preset network through the first network node. Different second network nodes each establish a communication channel to communicate with the first network node, respectively. When sending messages to different second network nodes, the first network node will unicast corresponding messages to various different second network nodes in an Ad-Hoc mode, such that a communication connection between the first network node and a second network node is established while reducing interference to another node and saving a network resource, so that network access information, such as configuration information, may be sent to the second network nodes, facilitating joining the preset network by the second network node.

In another example of the present application, when playing a role that seeks access to the preset network, the first network node may at the same time serve as a second network node. When switching to a second network node to access the preset network, the first network node performs any step to be performed by the second network node. When playing a role that has gained access to the preset network, a second network node may at the same time serve as the first network node. After gaining access to the preset network, a second network node may serve as a first network node to execute any step to be performed by the first network node.

The method according to the example aims at the first network node in the preset network, i.e., is applied to the first network node. The first network node serve to perform the method. As an example, a single second network node seeking access to the preset network is described.

For S100, before joining the preset network, the second network node broadcasts a broadcast message carrying a second IP address of the second network node. Here the broadcast message serves as a probe message. The second network node does not acquire the IP address of the first network node. Therefore, the second network node cannot perform direct Ad-Hoc message sending to the first network node. Consequently, the second network node broadcasts the probe message. Each node in the network may receive the probe message, which facilitates receiving the probe message by the first network node.

The first network node receives the probe message sent by the second network node. The probe message carries the second IP address of the second network node. The second IP address is configured for establishing a connection between the first network node and the second network node. After the connection between the first network node and the second network node is established, the first network node may unicast a message to the second network node in an Ad-Hoc mode. In this way, a message may be sent to the second network node without causing information interference to another node.

The second IP address of the second network node may refer to a second IP address acquired from a server in the network through a wired network interface when the second network node detects that a cable is connected to the preset wired network interface. Then, the second IP address is allocated to the second network node through dynamic allocation. For example, through Dynamic Host Configuration Protocol (DHCP) allocation, the second IP address may identify a corresponding second network node.

For S200, after receiving the probe message sent by the second network node, the first network node may acquire the second IP address of the second network node, and may communicate with the second network node after acquiring the second IP address. In the example, according to the probe message, the first network node determines whether the probe message includes a configuration mechanism identifier. If it is determined that the probe message includes a configuration mechanism identifier, the first network node may unicast, based on the second IP address, a reply message of the probe message to the second network node. The reply message carries a first IP address of the first network node. The first IP address may be used by the first network node to establish a network communication channel with the second network node.

In the example, the configuration mechanism identifier is configured to indicate that the second network node sending the probe message is a node meeting a network access condition. When the probe message includes a matching mechanism identifier, it means that the second network node sending the probe message containing the configuration mechanism identifier is a node meeting a network access condition. Otherwise, the first network node will not send any reply message to the second network node. When the received probe message includes the configuration mechanism identifier, it is determined that the second network node sending the probe message is a node meeting the network access condition, and the first network may unicast the reply message of the probe message to the second network node. The configuration mechanism identifier may be a preset identifier such as a preset character string, such as 8b699cf269c6c36812481e195a0995a6. If it is determined that the received probe message includes the character string, a reply message is then sent to the second network node.

As the reply message is unicast by the first network node to the second network node in an Ad-Hoc mode, the reply message is sent by the first network node directly to the second network node. When the first network node unicasts the reply message to the second network node, another node in the network cannot receive the reply message, and only the second network node can receive the reply message. Thus, efficiency of the reply message may be improved, reducing interference of the reply message to the other node, while reducing network resource use.

In another example, a network communication channel may be established based on the second IP address and the first IP address.

After receiving the probe message sent by the second network node, the first network node may acquire the second IP address of the second network node. After the first network node has unicast the reply message to the second network node, the second network node may acquire the first IP address of the first network node. The first IP address may be configured for establishing a network communication channel between the second network node and the first network node. After the first network node and the second network node have exchanged IP addresses with each other, the network communication channel between the first network node and the second network node may be established according to the IP addresses. Message exchange may be implemented through the connection.

In S300, network configuration information is sent to the second network node through the established network communication channel. The network configuration information is configured to allow the second network node to access the preset network. The second network node may perform configuration synchronization according to the network configuration information. The configuration information may include at least a wireless configuration. Wireless configuration information may further include: a Service Set (SS), according to which a Service Set Identifier (SSID) may be determined; a working channel, a working mode, a bandwidth, a maximum spatial flow, etc.

After the network communication channel between the first network node and the second network node has been established, the two nodes may communicate with each other. The first network node may send the configuration information to the second network node, for the second network node to synchronize the configuration information. After the second network node has synchronized the configuration information with the first network node, the second network node may cooperate with the first network node or another node in the network according to the synchronized configuration information to provide a network service to a user terminal, etc.

With the method, the network communication channel between the first network node and the second network node may be established. According to the network communication channel, the first network node may send the network configuration information to the second network node for the second network node to perform configuration synchronization. Having performed the configuration synchronization according to the network configuration information, the second network node may join the preset network.

On one hand, when a node adopts a wireless access mode, a network configuration procedure is still adopted, and a trusted access node may be selected, ensuring security. When it is detected that a node adopts a wired access mode, due to high security in wired network access, there is no need to consider the security issue. Thus, with an automatic network configuration mechanism of the solution, automatic network access is implemented without requiring a user to get involved in the network configuration process, meeting both a security requirement in wireless access and a simplified flow in wired access.

When the second network node joins the preset network, automatic network access by the second network node may be implemented through information exchange between the first network node and the second network node with no manual operation of configuration setting and synchronization, reducing operation steps for the second network node to join the preset network, saving operation time for the second network node to join the preset network, decreasing complexity of the operation for the second network node to access the network, improving efficiency in network access, implementing automatic network access by the second network node, improving user experience.

On the other hand, the first network node unicasts the reply message to the second network node. The first network node and the second network node perform one-to-one information transmission. The reply message may be sent directly to the second network node corresponding to the second network IP address. In this way, no interference to information transmission and receiving by another node is produced during information delivery. The first network node may send an Ad-Hoc message to the second network node better. The second network node may also receive the reply message sent by the first network node better. In addition, network resource occupation is reduced.

In another example, in S200, the method further includes a step as follows.

before the reply message of the probe message is unicast to the second network node, it may be determined, according to a pre-stored configuration mechanism identifier, whether the probe message includes the configuration mechanism identifier.

The configuration mechanism identifier may be stored in the first network node. After the probe message has been received, it may be determined, according to the stored configuration mechanism identifier, whether the probe message includes the configuration mechanism identifier.

The configuration mechanism identifier may be an identifier in a preset format, such as a character string in a preset format. When it is determined that the probe message is a broadcast message in a preset format, a reply message carrying the first IP address may be unicast to the second network node based on the second IP address.

In the example, after the first network node has received the probe message sent by the second network node, the first network node determines whether the probe message includes the configuration mechanism identifier, to further determine whether the probe message is a probe message broadcast by the second network node meeting a network access condition. When determining that the probe message is a probe message broadcast by the second network node meeting a network access condition, the first network node unicasts the reply message to the second network node according to the second IP address of the second network node. When determining that the probe message is not a probe message broadcast by the second network node meeting a network access condition, the first network node does not unicast the reply message to the second network node.

The probe message here may be sent in form of a broadcast packet, and the first network node receives the probe message in form of a broadcast packet. The preset format may be preset as needed, such as to be xxxx-xxx-x-xxxxxxx, etc., the specific preset format of which is not limited here. The probe message may include the second IP address of the second network node.

In the example, as long as the configuration mechanism identifier conforms to a preset format. it may be determined that the configuration mechanism identifier is a broadcast message in the preset format, and the first network node unicasts the reply message to the second network node according to the second IP address. If it is determined that the configuration mechanism identifier is not a broadcast in the preset format, the first network node does not unicast the reply message to the second network node.

In an example, the preset format may be a format different from a common broadcast message.

In another example, in S100, the probe message broadcast by the second network node seeking access to the preset network may be received as follows.

It may be monitored whether the probe message broadcast by the second network node is received at a preset port of the first network node. When it is monitored that the probe message is received at the preset port of the first network node, the probe message may be received through the preset port.

In the example, the first network node and the second network node may be physically connected with each other in a wired mode. Both the first network node and the second network node have a connection port, such as a Wide Area Network (WAN) port, a Local Area Network (LAN) port, etc. The first network node may implement a physical connection with the second network node through the preset port, specifically through a cable. The preset port may also be another port, which may be set as needed and is not limited here. After the first network node has implemented a physical connection with the second network node through the preset port, the first network node receives, through the preset port, the probe message sent by the second network node, implementing receiving of the probe message.

In the example, the preset port of the first network node may also be: a User Datagram Protocol (UDP) port. Some UDP ports may be designated as the preset port as needed.

It ma be monitored whether a probe message is received at the preset port. If it is monitored that the preset port receives the probe message, the probe message is received through the preset port, implementing receiving of the probe message.

In the example, the first network node does not unicast the reply message to the second network node unless the first network node has received, from the preset port, the probe message sent by the second network node. That is, when receiving the probe message from the preset port, the first network node determines that the probe message may be a probe message broadcast by the second network node meeting a network access condition. Whether a probe message is received at the preset port is taken as a condition for the second network node to access the network. If a probe message is sent from a port other than the preset port, it is determined that the probe message is not a probe message broadcast by the second network node meeting the network access condition, and the first network node does not unicast the reply message to the second network node.

In another example, alternatively, when selected as the first network node, a network node in the preset network starts to monitor whether a probe message broadcast by the second network node is received at the preset port. A node other than the first network node may not perform the monitoring.

In another example, the method may further include an option as follows.

It may be monitored whether the probe message broadcast by the second network node is received at a preset port of the first network node. When it is monitored that the probe message is received at the preset port of the first network node, the probe message may be received through the preset port.

It may be determined, according to a pre-stored configuration mechanism identifier, whether the probe message includes the configuration mechanism identifier. When the probe message includes a configuration mechanism identifier, a reply message may be unicasted to the second network node.

In the example, a reply message may be unicasted to the second network node combining the preset port and the configuration mechanism identifier. When the probe message is a probe message received by the first network node from the preset port, and the probe message includes the configuration mechanism identifier, the first network node unicasts the reply message to the second network node based on the second IP address.

In another example, a network communication channel between the first network node and the second network node may be established as follows.

A secure network communication channel with the second network node may be established according to the first IP address and the second IP address. The secure network communication channel may be configured at least to synchronize network configuration information between the first network node and the second network node.

After the first network node has acquired the second IP address of the second network node, the first network node has sent the first IP address of the first network node to the second network node, and the second network has received the first IP address of the first network node, a secure network communication channel between the first network node and the second network node may be established according to the first IP address and the second IP address. Information exchange between the first network node and the second network node may be performed through the secure network communication channel, improving security in information exchange.

The specific process of establishing the network communication channel is not limited here. A secure network communication channel may be established combining the first IP address and the second IP address according to a Transmission Control Protocol (TCP)/IP protocol or a Transport Layer Security (TLS) protocol.

In another example, the established secure network communication channel includes: a network communication channel based on key communication or a network communication channel based on a digital certificate.

For the network communication channel based on key communication, the first network node may encrypt, according to a public key of the second network node, a message sent to the second network node, such as wireless configuration information for synchronizing wireless configuration between the first network node and the second network node. After the second network node has received the encrypted message, the second network node may decrypt the encrypted message through a private key of the second network node. Thus, the second network node may acquire the wireless configuration information. Since the public key of the second network node is public, the first network node may acquire the public key of the second network node. The private key of the second network node is not public, and is known just by the second network node. Therefore, after receiving the encrypted message sent by the first network node, another node cannot decrypt the message encrypted using the public key of the second network node due to lack of the private key of the second network node, improving security in message transmission.

For the network communication channel based on a digital certificate, a transmitted message is encrypted using a digital signature, facilitating verifying, by the second network node, whether a message sent to the second network node is sent by the first network, further improving security in message transmission.

Figure 2:
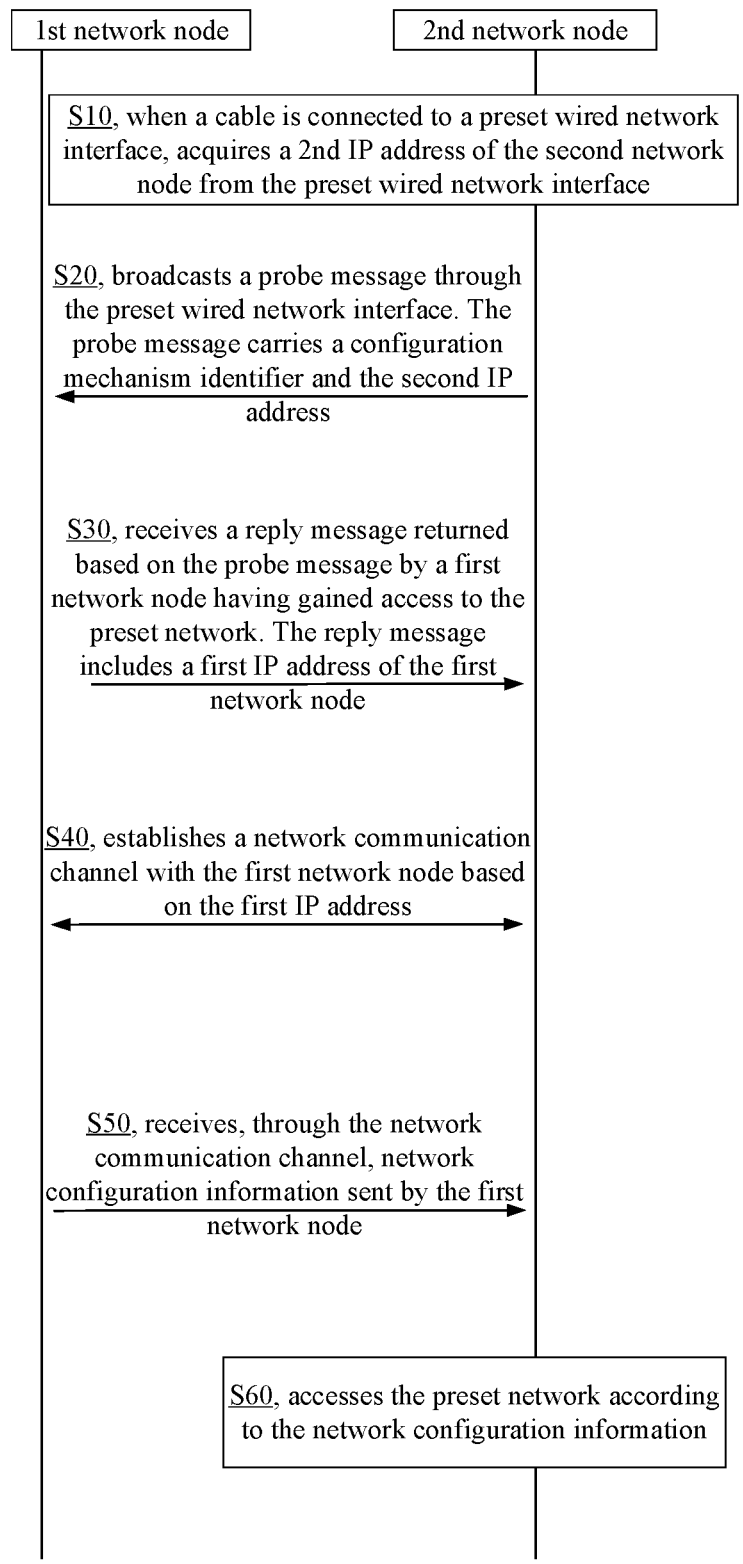
FIG. 2 is another diagram of timing of accessing a network by a network node according to an illustrative example.

In another example, referring to FIG. 2, which is a diagram of timing of accessing a network by a network node. The method is applied to a second network node seeking access to a preset network. The preset network further includes a first network node which is different from the second network node. The method includes steps as follows.

In S10, if it is detected that a cable is connected to a preset wired network interface, a second Internet Protocol (IP) address of the second network node is acquired from the preset wired network interface.

In S20, a probe message is broadcast through the preset wired network interface. The probe message carries a configuration mechanism identifier and the second IP address.

In S30, a reply message returned based on the probe message by a first network node having gained access to the preset network is received. The reply message includes a first IP address of the first network node.

In S40, a network communication channel is established with the first network node based on the first IP address.

In S50, network configuration information sent by the first network node is received through the network communication channel.

In S60, the preset network is accessed according to the network configuration information.

In the example, the second network node seeking access to the present network performs the steps.

For S10, if it is detected that a cable is connected to a preset wired network interface, a second Internet Protocol (IP) address of the second network node is acquired from the preset wired network interface. The second network node has a cable interface. In the example, a cable is connected through the preset wired network interface. Therefore, when it is detected that a cable is connected to a preset wired network interface, the second IP address may be acquired through the preset wired network interface.

The preset wired network interface may be set as needed, such as to be a WAN port, a LAN port, etc.

The second IP address of the second network node may be an IP address allocated dynamically to the second network node by a server in the network, such as allocated via a Dynamic Host Configuration Protocol after the first network node and the second network node have been connected through the cable. The second IP address may identify a corresponding second network node.

For S20, having acquired the second IP address successfully, the second network node may send a probe message to the first network node through the preset wired network interface. The probe message carries a configuration mechanism identifier and the second IP address.

The configuration mechanism identifier may be configured for the first network node to determine, after receiving the probe message, whether the second network node is a node meeting a network access condition. The configuration mechanism may serve as a network access determining condition for a node. The configuration mechanism identifier may be configured to indicate that the second network node sending the probe message is a node meeting the network access condition. When the probe message includes the configuration mechanism identifier, it means that the second network node sending the probe message containing the configuration mechanism identifier is a node meeting the network access condition. Otherwise, the first network node will not send a reply message to the second network node. When the received probe message includes the configuration mechanism identifier, it may be determined that the second network node sending the probe message is a node meeting the network access condition, and the first network may unicast a reply message of the probe message to the second network node. The configuration mechanism identifier may be a preset identifier such as a preset character string, such as 8b699cf269c6c36812481e195a0995a6. If it is determined that the received probe message includes the character string, a reply message may then be sent to the second network node.

The second IP address may be configured for establishing a network communication channel between the first network node and the second network node, facilitating information exchange between the first network node and the second network node. After a network communication channel has been established between the first network node and the second network node, the first network node may unicast a message to the second network node in an Ad-Hoc mode. In this way, a message may be sent to the second network node without causing information interference to another node.

For S30, a reply message carrying the first IP address of the first network node unicast to the second network node by the first network node having gained access to the preset network may be received. The first IP address may be configured for establishing a network communication channel between the second network node and the first network node.

The first network node may acquire the second IP address of the second network node after receiving the probe message sent by the second network node, and may communicate with the second network node after acquiring the second IP address. The first network node may unicast, based on the second IP address, the reply message carrying the first IP address of the first network node to the second network node. As the reply message is unicast by the first network node to the second network node in an Ad-Hoc mode, the reply message may be sent directly to the second network node by the first network node.

In S40, a network communication channel may be established based on the first IP address and the first network node. The second network node may receive the reply message to acquire the first IP address of the first network node, facilitating establishment of the network communication channel between the first network node and the second network node.

In S50, information to be exchanged for the second network node to access the network, such as network configuration information for the second network node to access the network, may be transmitted via the established network communication channel.

After a network communication channel has been established between the first network node and the second network node, the two node may communicate with each other. The first network node may send network configuration information to the second network node. The second network node may receive the network configuration information and synchronize network configuration information.

In S60, the preset network is accessed according to the network configuration information. The second network node may perform configuration synchronization, including wireless configuration synchronization, according to configuration information sent by the first network node for configuration synchronization between the first network node and the second network node. After completing network configuration synchronization, the second network node may access the preset network, completing network access.

After the second network node has synchronized the configuration information with the first network node, the second network node may cooperate with the first network node or another node in the network according to the synchronized configuration information to provide a network service to a user terminal, etc.

In an example, an IP address may be acquired when a physical connection (wired connection at a physical layer) is established through a wired network port of the second network node.

In another example, in S20, the probe message may be broadcast through the preset wired network interface as follows.

The probe message may be broadcast to a preset port of the first network node through the preset wired network interface.

The second network node may broadcast the probe message to the preset port of the first network node through the preset wired network interface, facilitating determining, by the first network node, whether the node sending the probe message is a node meeting a network access condition.

In another example, the probe message may be sent in form of a broadcast packet, and the second network node sends the probe message in form of a broadcast packet to the first network node. The probe message may include a configuration mechanism identifier in a preset format. The preset format may be preset as needed, such as to be xxxx-xxx-x-xxxxxxx, etc., the specific preset format of which is not limited here. The probe message may further include the second IP address of the second network node.

The second network node sends a probe message in the preset format to the first network node, facilitating determining, by the first network node, whether the probe message is a probe message broadcast by the second network node meeting a network access condition. When determining that the probe message is the probe message broadcast by the second network node meeting the network access condition, the first network node unicasts a reply message to the second network node according to the second IP address of the second network node. When determining that the probe message is not the probe message broadcast by the second network node meeting the network access condition, the first network node does not unicast a reply message to the second network node.

The reply message may be sent after the first network node has determined that the configuration mechanism identifier is an identifier in the preset format.

In another example, in S40, a network communication channel may be established with the first network node based on the first IP address as follows.

A secure network communication channel with the first network node may be established according to the first IP address and the second IP address. The secure network communication channel may be configured at least to synchronize network configuration information between the first network node and the second network node.

After the first network node has acquired the second IP address of the second network node, the first network node has sent the first IP address of the first network node to the second network node, and the second network has received the first IP address of the first network node, a secure network communication channel between the first network node and the second network node may be established according to the first IP address and the second IP address. Information exchange between the first network node and the second network node may be performed through the secure network communication channel, improving security in information exchange.

The specific process of establishing the connection is not limited here. A secure network communication channel may be established combining the first IP address and the second IP address according to a Transmission Control Protocol (TCP)/IP protocol or a Transport Layer Security (TLS) protocol.

In another example, the established secure network communication channel includes: a network communication channel based on key communication or a network communication channel based on a digital certificate.

For the network communication channel based on key communication, the first network node may encrypt, according to a public key of the second network node, a message sent to the second network node, such as wireless configuration information for synchronizing wireless configuration between the first network node and the second network node. After the second network node has received the encrypted message, the second network node may decrypt the encrypted message through a private key of the second network node. Thus, the second network node may acquire the wireless configuration information. Since the public key of the second network node is public, the first network node may acquire the public key of the second network node. The private key of the second network node is not public, and is known just by the second network node. Therefore, after receiving the encrypted message sent by the first network node, another node cannot decrypt the message encrypted using the public key of the second network node due to lack of the private key of the second network node, improving security in message transmission.

For the network communication channel based on a digital certificate, a transmitted message is encrypted using a digital signature, facilitating verifying, by the second network node, whether a message sent to the second network node is sent by the first network, further improving security in message transmission.

Figure 3:
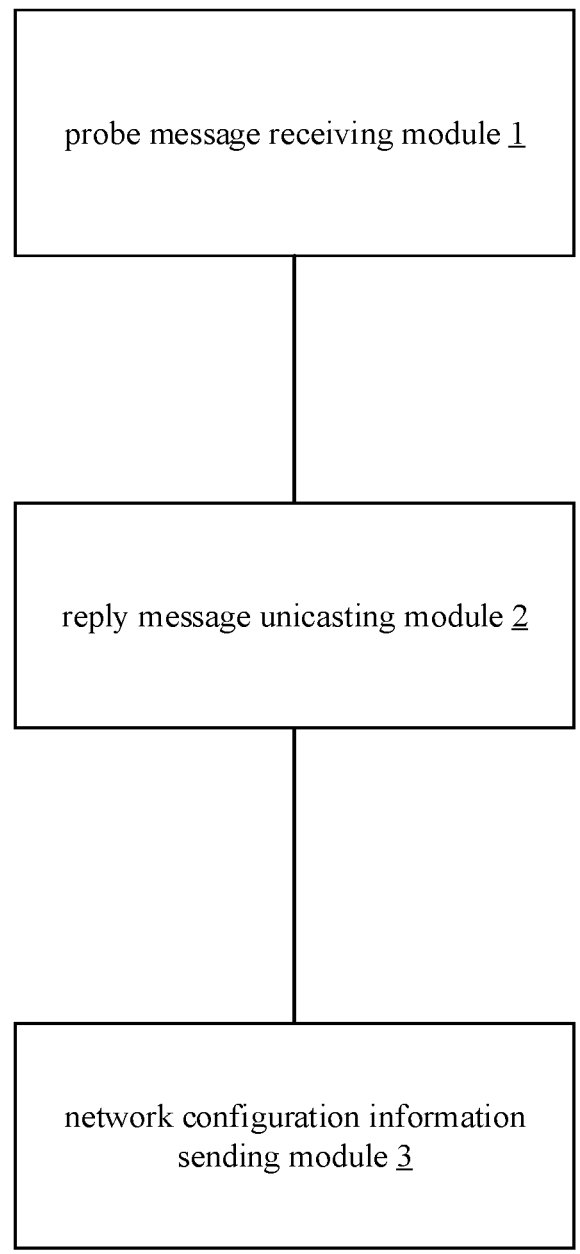
FIG. 3 is a diagram of a structure of a device for accessing a network by a network node according to an illustrative example.

In another example, a device for accessing a network by a network node is also provided. The device is applied to a first network node having gained access to a preset network. FIG. 3 is a diagram of a structure of the device. The device includes a probe message receiving module, a reply message unicasting module, and a network configuration information sending module.

The probe message receiving module 1 is configured to receive a probe message broadcast by a second network node seeking access to the preset network. The probe message carries a second Internet Protocol (IP) address of the second network node.

The reply message unicasting module 2 is configured to, in response to that the probe message includes a configuration mechanism identifier, unicast, based on the second IP address, a reply message of the probe message to the second network node. The reply message carries a first IP address of the first network node. The first IP address is configured for establishing a network communication channel between the second network node and the first network node.

The network configuration information sending module 3 is configured to send network configuration information to the second network node through the network communication channel. The network configuration information is configured to allow the second network node to access the preset network.

In another example, the device further includes a configuration mechanism identifier determining module configured to determine whether the probe message includes the configuration mechanism identifier according to a pre-stored configuration mechanism identifier.

In another example, the probe message receiving module 1 is further configured to monitor whether the probe message broadcast by the second network node is received at a preset port of the first network node; and in response to monitoring that the probe message is received at the preset port of the first network node, receive the probe message through the preset port.

The probe message receiving module 1 may be further configured to implement a case where the preset network is a Mesh network, the Mesh network includes multiple network nodes having gained access to the Mesh network, one network node of the multiple network nodes is selected through a preset selection mechanism to serve as the first network node within a predetermined period of time, and when being selected as the first network node, the one network node starts to monitor whether the probe message broadcast by the second network node is received at the preset port.

Figure 4:
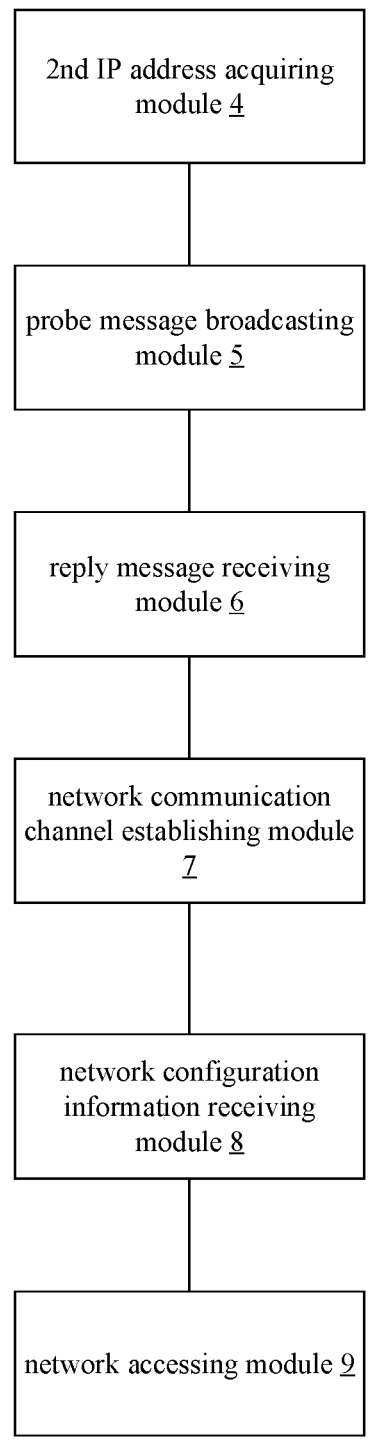
FIG. 4 is another diagram of a structure of a device for accessing a network by a network node according to an illustrative example.

In another example, another device for accessing a network by a network node is also provided. The device is applied to a second network node seeking access to a preset network. The preset network further includes a first network node which is different from a second network node. FIG. 4 is a diagram of a structure of the device. The device includes a second Internet Protocol (IP) address acquiring module, a probe message broadcasting module, a reply message receiving module, a network communication channel establishing module, a network configuration information receiving module, and a network accessing module.

The second Internet Protocol (IP) address acquiring module 4 is configured to, in response to detecting that a cable is connected to a preset wired network interface, acquire a second Internet Protocol (IP) address of the second network node from the preset wired network interface.

The probe message broadcasting module 5 is configured to broadcast a probe message through the preset wired network interface. The probe message carries a configuration mechanism identifier and the second IP address.

The reply message receiving module 6 is configured to receive a reply message returned based on the probe message by a first network node having gained access to the preset network. The reply message includes a first IP address of the first network node.

The network communication channel establishing module 7 is configured to establish a network communication channel with the first network node based on the first IP address.

The network configuration information receiving module 8 is configured to receive, through the network communication channel, network configuration information sent by the first network node.

The network accessing module 9 is configured to access the preset network according to the network configuration information.

In another example, the probe message broadcasting module 5 is further configured to broadcast, through the preset wired network interface, the probe message to a preset port of the first network node.

In another example, electronic equipment is also provided.

The electronic equipment includes a processor and a memory configured to store executable instructions executable on the processor.

The processor is configured to execute the executable instructions to implement the method as described in any abovementioned example.

In another example, there is also provided a transitory or non-transitory computer-readable storage medium storing computer-executable instructions which, when executed by a processor, implement the method as described in any abovementioned example.

Figure 5:
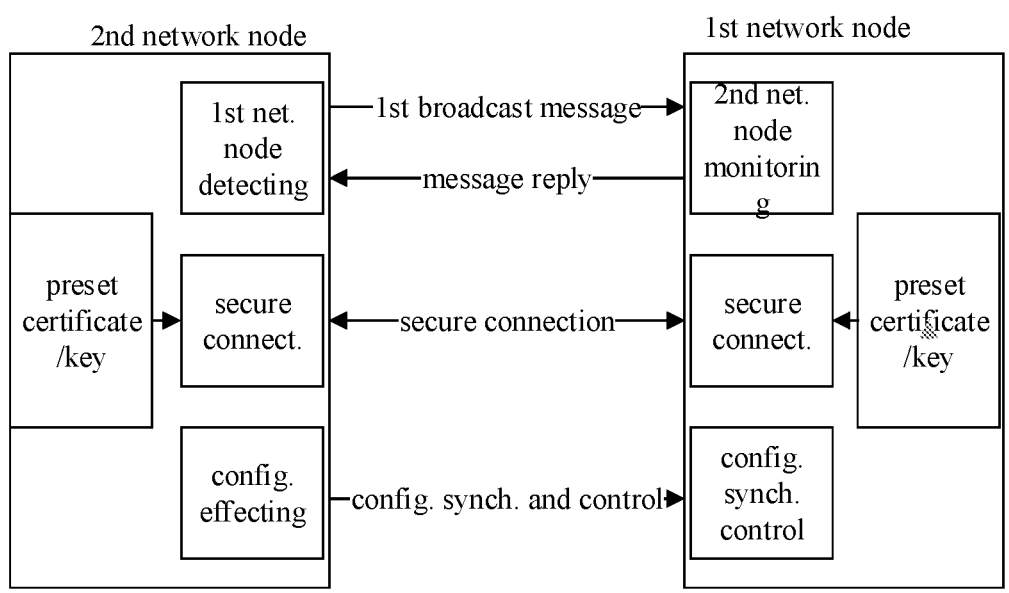
FIG. 5 is another diagram of a structure of a device for accessing a network by a network node according to an illustrative example.

In another example, a device for accessing a network by a network node is also provided. FIG. 5 is a diagram of the device.

The device includes a first network node and a second network node.

The first network node includes a second network node monitoring module, a secure connection module, and a configuration synchronization control module.

The second network node includes a first network node detecting module, a secure connection module, and a configuration effecting module.

The modules each function as follows.

The second network node monitoring module is configured to monitor a broadcast packet at a specific port, and reply a corresponding message if the broadcast packet conforms to a preset format. The reply message carries IP information of the first network node.

The first network node detecting module is configured to send, to a specific port from a specific wired port (such as a WAN port or a specific LAN port), a broadcast packet according to a preset format.

The secure connection module is configured to establish a secure communication connection according to a preset certificate or a key.

The configuration synchronization control module is configured to send, in a preset coding mode, a command or configuration existing on the first network node to an Agent or equipment seeking access.

The configuration effecting module is configured to effect a configuration or effect command processing according to the received command or configuration (WiFi configuration, in terms of functioning) of the first network node.

In another example, there is further provided a method for accessing a network by a network node. The method may include an option as follows.

1. A unique first network node may be elected in a formed Mesh network, and the remaining network nodes may be second network nodes.

2. When selected as the first network node, equipment runs an equipment-seeking-access monitoring module, a secure connection module, and a configuration synchronization control module.

3. A first network node detecting module, a secure connection module, and a configuration effecting module may be run on the second network node. A specific wired port of the second network node is may be connected to any network equipment in the formed Mesh network through a cable. The first network node detecting module on the network equipment may detect continuously whether a cable is connected to the specific wired port, and when it is detected that a cable is connected to the specific wired port, acquire an IP from the specific wired port through DHCP. After the IP has been acquired successfully, the first network node detecting module may send a broadcast packet in a specific format from the specific wired port to a specific port.

4. After receiving a broadcast packet conforming to a preset format, the second network node monitoring module on the first network node may reply a unicast packet to a source address of the broadcast packet. The unicast packet may carry the IP address of the first network node.

5. After receiving a reply message, the second network node may establish a secure connection communication channel with the IP of the first network node in the message according to a preset certificate or a key.

6. After the secure connection communication channel has been established, the first network node may call a configuration synchronization module to synchronize the configuration to equipment seeking access. After receiving the configuration, the equipment seeking access may effect the synchronized configuration, complete the configuration, and become the second network node. After the configuration is completed, the first network node may become a node in the formed network. Meanwhile, a detecting module of the first network node may be closed.

It is to be noted that "first" and "second" in examples of the present disclosure are merely for convenience of description and distinguishing, with no other specific meanings.

Figure 6:
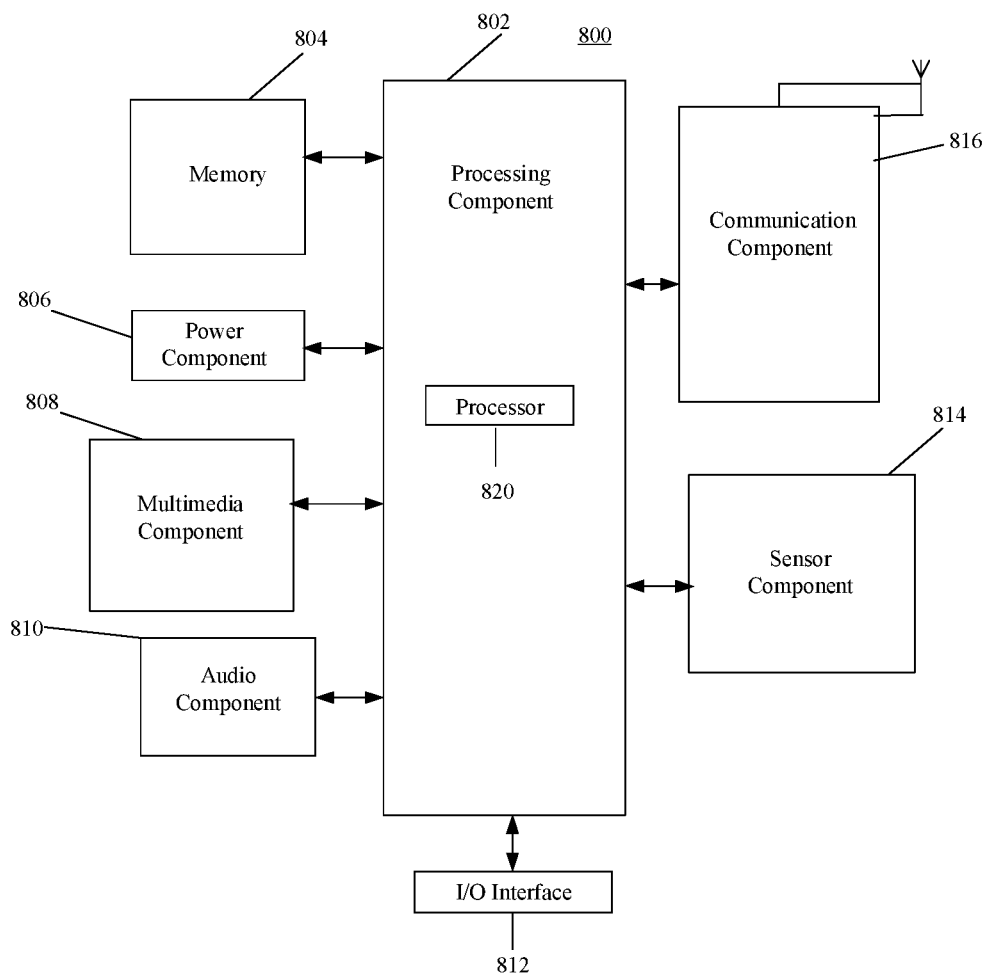
FIG. 6 is a block diagram of terminal equipment 800 according to an illustrative example.

FIG. 6 is a block diagram of terminal equipment 800 according to an illustrative example. For example, the terminal equipment may be a mobile phone, a computer, a digital broadcasting terminal, a message transceiver, a game console, tablet equipment, medical equipment, fitness equipment, a Personal Digital Assistant (PDA), etc.

Referring to FIG. 6, the terminal equipment may include one or more components as follows: a processing component 802, a memory 804, a power component 806, a multimedia component 808, an audio component 810, an Input/Output (I/O) interface 812, a sensor component 814, and a communication component 816.

The processing component 802 generally controls an overall operation of the terminal equipment, such as operations associated with display, a telephone call, data communication, a camera operation, a recording operation, etc. The processing component 802 may include one or more processors 820 to execute instructions so as to complete all or some steps of the method. In addition, the processing component 802 may include one or more modules, facilitating interaction between the processing component 802 and other components. For example, the processing component 802 may include a multimedia module, facilitating interaction between the multimedia component 808 and the processing component 802.

The memory 804 is configured to store various types of data to support operation on the terminal equipment. Examples of these data include instructions of any application or method configured to operate on the terminal equipment, contact data, phonebook data, messages, images, videos, and/etc. The memory 804 may be implemented by any type of volatile or non-volatile storage equipment or combination of the volatile or non-volatile storage equipment, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power component 806 supplies electric power to various components of the terminal equipment. The power component 806 may include a power management system, one or more power supplies, and other components related to generating, managing and distributing electric power for the terminal equipment.

The multimedia component 808 includes a screen providing an output interface between the terminal equipment and a user. The screen may include a Liquid Crystal Display (LCD) and a Touch Panel (TP). If the screen includes a TP, the screen may be implemented as a touch screen to receive an input signal from a user. The TP includes one or more touch sensors for sensing touch, slide and gestures on the TP. The touch sensors not only may sense the boundary of a touch or slide move, but also detect the duration and pressure related to the touch or slide move. In some examples, the multimedia component 808 includes a front camera and/or a rear camera. When the terminal equipment is in an operation mode such as a shooting mode or a video mode, the front camera and/or the rear camera may receive external multimedia data. Each of the front camera and/or the rear camera may be a fixed optical lens system or may have a focal length and be capable of optical zooming.

The audio component 810 is configured to output and/or input an audio signal. For example, the audio component 810 includes a microphone (MIC). When the terminal equipment is in an operation mode such as a call mode, a recording mode, and a voice recognition mode, the MIC is configured to receive an external audio signal. The received audio signal may be further stored in the memory 804 or may be sent via the communication component 816. In some examples, the audio component 810 further includes a loudspeaker configured to output the audio signal.

The I/O interface 812 provides an interface between the processing component 802 and a peripheral interface module. The peripheral interface module may be a keypad, a click wheel, a button, etc. These buttons may include but are not limited to: a homepage button, a volume button, a start button, and a lock button.

The sensor component 814 includes one or more sensors for assessing various states of the terminal equipment. For example, the sensor component 814 may detect an on/off state of the terminal equipment and relative location of components such as the display and the keypad of the terminal equipment. The sensor component 814 may further detect a change in the location of the terminal equipment or of a component of the terminal equipment, whether there is contact between the terminal equipment and a user, the orientation or acceleration/deceleration of the terminal equipment, and a change in the temperature of the terminal equipment. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application. In some examples, the sensor component 814 may further include an acceleration sensor, a gyroscope sensor, a magnetic sensor, a pressure sensor, or a temperature sensor.

The communication component 816 is configured, facilitating wired or wireless/radio communication between the terminal equipment and other equipment. The terminal equipment may access a radio network based on a communication standard such as WiFi, 2G, 3G, . . . , or a combination of the any communication standard. In an illustrative example, the communication component 816 broadcasts related information or receives a broadcast signal from an external broadcast management system via a broadcast channel. In an illustrative example, the communication component 816 further includes a Near Field Communication (NFC) module for short-range communication. For example, the NFC module may be implemented based on Radio Frequency Identification (RFID), Infrared Data Association (IrDA), Ultra-WideBand (UWB) technology, BlueTooth (BT) technology, and other technologies.

In an illustrative example, the terminal equipment may be implemented by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors or other electronic components, to implement the method.

Other implementations of the present disclosure will be apparent to a person having ordinary skill in the art that has deemed the specification and practiced the present disclosure. The present disclosure is intended to cover any variation, use, or adaptation of the present disclosure following the general principles of the present disclosure and including such departures from the present disclosure as come within common knowledge or customary practice in the art. The specification and the examples are intended to be illustrative.

It should be understood that the present disclosure is not limited to the exact construction that has been described above and illustrated in the accompanying drawings, and that various modifications and changes may be made to the present disclosure without departing from the scope of the present disclosure.

According to a first aspect of examples of the present disclosure, there is provided a method for accessing a network by a network node, applied to a first network node having gained access to a preset network. The method includes: receiving a probe message broadcast by a second network node seeking access to the preset network, the probe message carrying a second Internet Protocol (IP) address of the second network node; in response to that the probe message includes a configuration mechanism identifier, unicasting, based on the second IP address, a reply message of the probe message to the second network node, the reply message carrying a first IP address of the first network node, the first IP address being configured for establishing a network communication channel between the second network node and the first network node; and sending network configuration information to the second network node through the network communication channel. The network configuration information is configured to allow the second network node to access the preset network.

In an example, the method may further include: before unicasting the reply message of the probe message to the second network node, determining whether the probe message includes the configuration mechanism identifier according to a pre-stored configuration mechanism identifier.

In an example, receiving the probe message broadcast by the second network node seeking access to the preset network includes: monitoring whether the probe message broadcast by the second network node is received at a preset port of the first network node; and in response to monitoring that the probe message is received at the preset port of the first network node, receiving the probe message through the preset port.

In an example, the preset network is a Mesh network, the Mesh network includes multiple network nodes having gained access to the Mesh network, one network node of the multiple network nodes is selected through a preset selection mechanism to serve as the first network node within a predetermined period of time, and in response to being selected as the first network node, the one network node starts to monitor whether the probe message broadcast by the second network node is received at the preset port.

According to a second aspect of examples of the present disclosure, there is provided a method for accessing a network by a network node, applied to a second network node seeking access to a preset network. The method includes: in response to detecting that a cable is connected to a preset wired network interface, acquiring a second Internet Protocol (IP) address of the second network node from the preset wired network interface; broadcasting a probe message through the preset wired network interface, the probe message carrying a configuration mechanism identifier and the second IP address; receiving a reply message returned based on the probe message by a first network node having gained access to the preset network, the reply message including a first IP address of the first network node; establishing a network communication channel with the first network node based on the first IP address; receiving, through the network communication channel, network configuration information sent by the first network node; and accessing the preset network according to the network configuration information.

In an example, broadcasting the probe message through the preset wired network interface includes: broadcasting, through the preset wired network interface, the probe message to a preset port of the first network node.

According to a third aspect of examples of the present disclosure, there is provided a device for accessing a network by a network node, applied to a first network node having gained access to a preset network. The device includes a probe message receiving module, a reply message unicasting module, and a network configuration information sending module. The probe message receiving module is configured to receive a probe message broadcast by a second network node seeking access to the preset network. The probe message carries a second Internet Protocol (IP) address of the second network node. The reply message unicasting module is configured to, in response to that the probe message includes a configuration mechanism identifier, unicast, based on the second IP address, a reply message of the probe message to the second network node. The reply message carries a first IP address of the first network node. The first IP address is configured for establishing a network communication channel between the second network node and the first network node. The network configuration information sending module is configured to send network configuration information to the second network node through the network communication channel. The network configuration information is configured to allow the second network node to access the preset network.

According to a fourth aspect of examples of the present disclosure, there is provided a device for accessing a network by a network node, applied to a second network node seeking access to a preset network. The device includes a second Internet Protocol (IP) address acquiring module, a probe message broadcasting module, a reply message receiving module, a network communication channel establishing module, a network configuration information receiving module, and a network accessing module. The second Internet Protocol (IP) address acquiring module is configured to, in response to detecting that a cable is connected to a preset wired network interface, acquire a second Internet Protocol (IP) address of the second network node from the preset wired network interface. The probe message broadcasting module is configured to broadcast a probe message through the preset wired network interface. The probe message carries a configuration mechanism identifier and the second IP address. The reply message receiving module is configured to receive a reply message returned based on the probe message by a first network node having gained access to the preset network. The reply message includes a first IP address of the first network node. The network communication channel establishing module is configured to establish a network communication channel with the first network node based on the first IP address. The network configuration information receiving module is configured to receive, through the network communication channel, network configuration information sent by the first network node. The network accessing module is configured to access the preset network according to the network configuration information.

According to a fifth aspect of examples of the present disclosure, there is provided electronic equipment.

The electronic equipment includes: a processor; and a memory configured to store executable instructions executable on the processor.

The processor is configured to execute the executable instructions to implement any method here.

According to a sixth aspect of examples of the present disclosure, there is provided a non-transitory computer-readable storage medium storing computer-executable instructions which, when executed by a processor, implement any method here.

A technical solution provided by examples of the present disclosure may include beneficial effects as follows.

The solution is applied to a first network node of a preset network. The first network node receives a probe message sent by the second network node. The probe message carries a second IP address of the second network node. Thus, the second network node sends the second IP address of the second network node for connection establishment to the first network node successfully. Since the probe message carries the second IP address of the second network node, when it is determined that the probe message includes a configuration mechanism identifier indicating that the second network node sending the probe message is a node meeting a network configuration condition, the first network node may unicast a reply message carrying a first IP address of the first network node to the second network node according to the second IP address. A network communication channel with the second network node may be established through the first IP address and the second IP address, and network configuration information configured to allow the second network node to access the present network may be sent to the second network node through the network communication channel.

When a node adopts a wireless access mode, a network configuration procedure is still adopted, and a trusted access node may be selected, ensuring security. When it is detected that a node adopts a wired access mode, due to high security in wired network access, there is no need to consider the security issue. Thus, with an automatic network configuration mechanism of the solution, automatic network access is implemented without requiring a user to get involved in the network configuration process, meeting both a security requirement in wireless access and a simplified flow in wired access.

With the method, automatic network access by the second network node may be implemented through the first network node and the second network node without intervention from an operator and without any network configuration operation, reducing network access procedures and excessive complicated operations, saving network access time, improving efficiency in network access, improving network access experience.

On the other hand, the first network node unicasts the reply message to the second network node. The first network node and the second network node perform one-to-one information transmission. The reply message may be sent directly to the second network node corresponding to the second network IP address. In this way, no interference to information transmission and receiving by another node is produced during information delivery. The first network node may send an Ad-Hoc message to the second network node better. The second network node may also receive the reply message sent by the first network node better. In addition, network resource occupation is reduced.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

What is claimed is:

1. A method for accessing a network by a network node, applied to a first network node having gained access to a preset network, comprising:
   receiving a probe message broadcast by a second network node seeking access to the preset network, wherein the probe message carries a second Internet Protocol (IP) address of the second network node;
   in response to that the probe message comprises a configuration mechanism identifier, unicasting, based on the second IP address, a reply message of the probe message to the second network node, wherein the reply message carries a first IP address of the first network node, and the first IP address is configured for establishing a network communication channel between the second network node and the first network node; and
   sending network configuration information to the second network node through the network communication channel, wherein the network configuration information is configured to allow the second network node to access the preset network.

2. The method of claim 1, before unicasting the reply message of the probe message to the second network node, further comprising:
   determining whether the probe message comprises the configuration mechanism identifier according to a pre-stored configuration mechanism identifier.

3. The method of claim 1, wherein receiving the probe message broadcast by the second network node seeking access to the preset network comprises:
   monitoring whether the probe message broadcast by the second network node is received at a preset port of the first network node; and
   in response to monitoring that the probe message is received at the preset port of the first network node, receiving the probe message through the preset port.

4. The method of claim 3, wherein:
   the preset network is a Mesh network, the Mesh network comprises multiple network nodes having gained access to the Mesh network, and one network node of the multiple network nodes is selected through a preset selection mechanism to serve as the first network node within a predetermined period of time, and
   in response to being selected as the first network node, the one network node starts to monitor whether the probe message broadcast by the second network node is received at the preset port.

5. The method of claim 2, wherein receiving the probe message broadcast by the second network node seeking access to the preset network comprises:
   monitoring whether the probe message broadcast by the second network node is received at a preset port of the first network node; and
   in response to monitoring that the probe message is received at the preset port of the first network node, receiving the probe message through the preset port.

6. The method of claim 5, wherein:
   the preset network is a Mesh network, the Mesh network comprises multiple network nodes having gained access to the Mesh network, and one network node of the multiple network nodes is selected through a preset selection mechanism to serve as the first network node within a predetermined period of time, and
   in response to being selected as the first network node, the one network node starts to monitor whether the probe message broadcast by the second network node is received at the preset port.

7. A method for accessing a network by a network node, applied to a second network node seeking access to a preset network, comprising:
   in response to detecting that a cable is connected to a preset wired network interface, acquiring a second Internet Protocol (IP) address of the second network node from the preset wired network interface;
   broadcasting a probe message through the preset wired network interface, wherein the probe message carries a configuration mechanism identifier and the second IP address;
   receiving a reply message returned based on the probe message by a first network node having gained access to the preset network, wherein the reply message comprises a first IP address of the first network node;
   establishing a network communication channel with the first network node based on the first IP address;
   receiving, through the network communication channel, network configuration information sent by the first network node; and
   accessing the preset network according to the network configuration information.

8. The method of claim 7, wherein broadcasting the probe message through the preset wired network interface comprises:

broadcasting, through the preset wired network interface, the probe message to a preset port of the first network node.

9. Electronic equipment, applied to a first network node having gained access to a preset network, comprising:
a processor; and
a memory configured to store executable instructions executable on the processor,
wherein the processor is configured to execute the executable instructions to implement:
receiving a probe message broadcast by a second network node seeking access to the preset network, wherein the probe message carries a second Internet Protocol (IP) address of the second network node;
in response to that the probe message comprises a configuration mechanism identifier, unicasting, based on the second IP address, a reply message of the probe message to the second network node, wherein the reply message carries a first IP address of the first network node, and the first IP address is configured for establishing a network communication channel between the second network node and the first network node; and
sending network configuration information to the second network node through the network communication channel, wherein the network configuration information is configured to allow the second network node to access the preset network.

10. The electronic equipment of claim 9, wherein the processor is further configured to implement:
before unicasting the reply message of the probe message to the second network node, determining whether the probe message comprises the configuration mechanism identifier according to a pre-stored configuration mechanism identifier.

11. The electronic equipment of claim 9, wherein the processor is configured to receive the probe message broadcast by the second network node seeking access to the preset network by:

monitoring whether the probe message broadcast by the second network node is received at a preset port of the first network node; and
in response to monitoring that the probe message is received at the preset port of the first network node, receiving the probe message through the preset port.

12. The electronic equipment of claim 11, wherein:
the preset network is a Mesh network, the Mesh network comprises multiple network nodes having gained access to the Mesh network, and one network node of the multiple network nodes is selected through a preset selection mechanism to serve as the first network node within a predetermined period of time, and
in response to being selected as the first network node, the one network node starts to monitor whether the probe message broadcast by the second network node is received at the preset port.

13. The electronic equipment of claim 10, wherein the processor is configured to receive the probe message broadcast by the second network node seeking access to the preset network by:
monitoring whether the probe message broadcast by the second network node is received at a preset port of the first network node; and
in response to monitoring that the probe message is received at the preset port of the first network node, receiving the probe message through the preset port.

14. The electronic equipment of claim 13, wherein:
the preset network is a Mesh network, the Mesh network comprises multiple network nodes having gained access to the Mesh network, and one network node of the multiple network nodes is selected through a preset selection mechanism to serve as the first network node within a predetermined period of time, and
in response to being selected as the first network node, the one network node starts to monitor whether the probe message broadcast by the second network node is received at the preset port.

* * * * *